March 10, 1942.                H. M. WOELFEL                2,275,811
                APPARATUS FOR FORMING MULTIPANE GLAZING UNITS
                    Filed May 13, 1938           5 Sheets-Sheet 1

INVENTOR
HAROLD. M. WOELFEL
BY J. D. O'Connell
ATTORNEY

March 10, 1942.   H. M. WOELFEL   2,275,811
APPARATUS FOR FORMING MULTIPANE GLAZING UNITS
Filed May 13, 1938   5 Sheets-Sheet 2
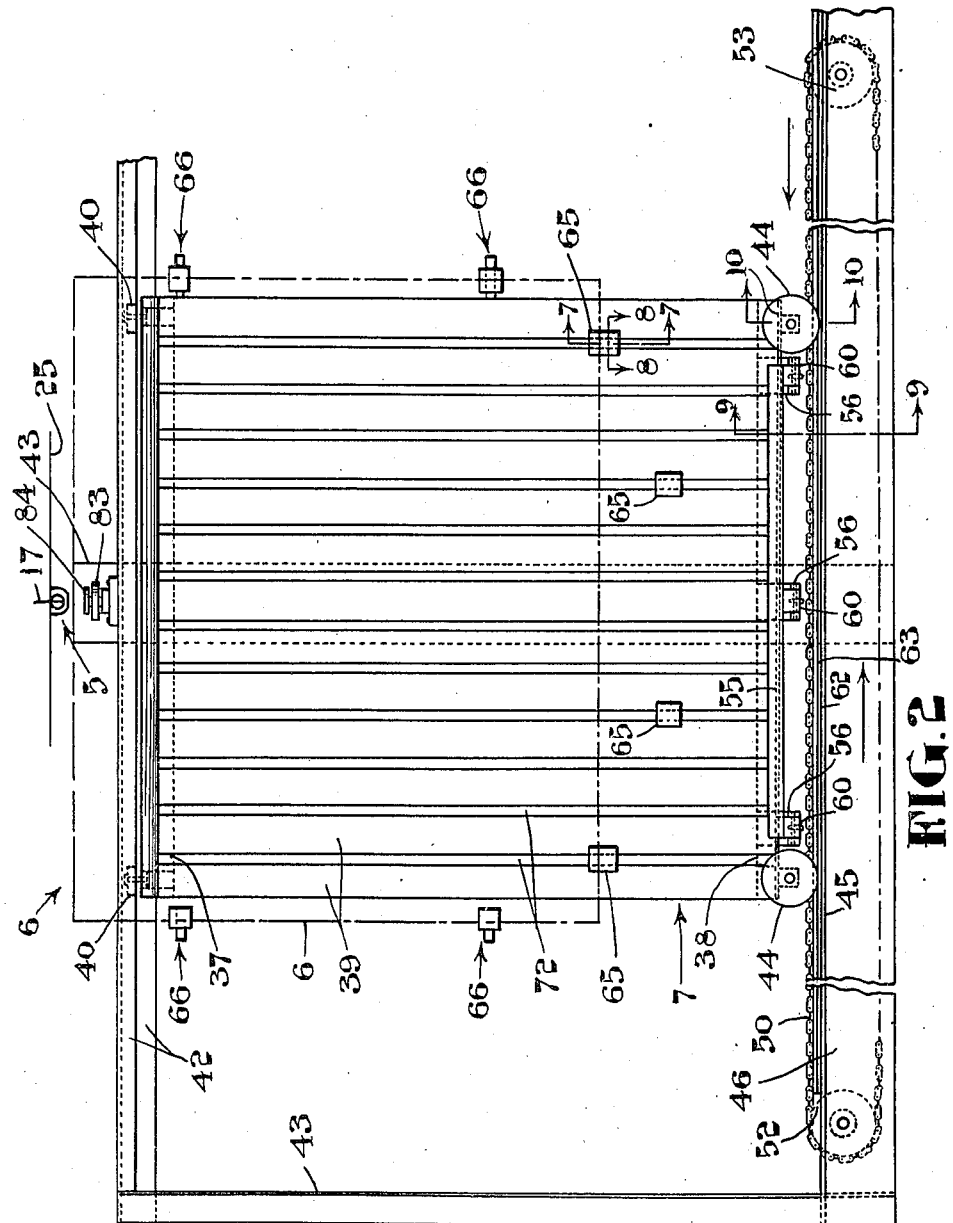
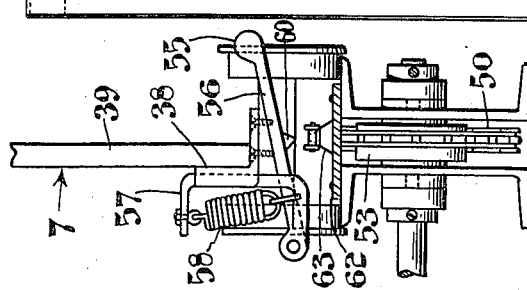
INVENTOR
HAROLD. M. WOELFEL
BY J. D. O'Connell
ATTORNEY March 10, 1942. H. M. WOELFEL 2,275,811
APPARATUS FOR FORMING MULTIPANE GLAZING UNITS
Filed May 13, 1938 5 Sheets-Sheet 3
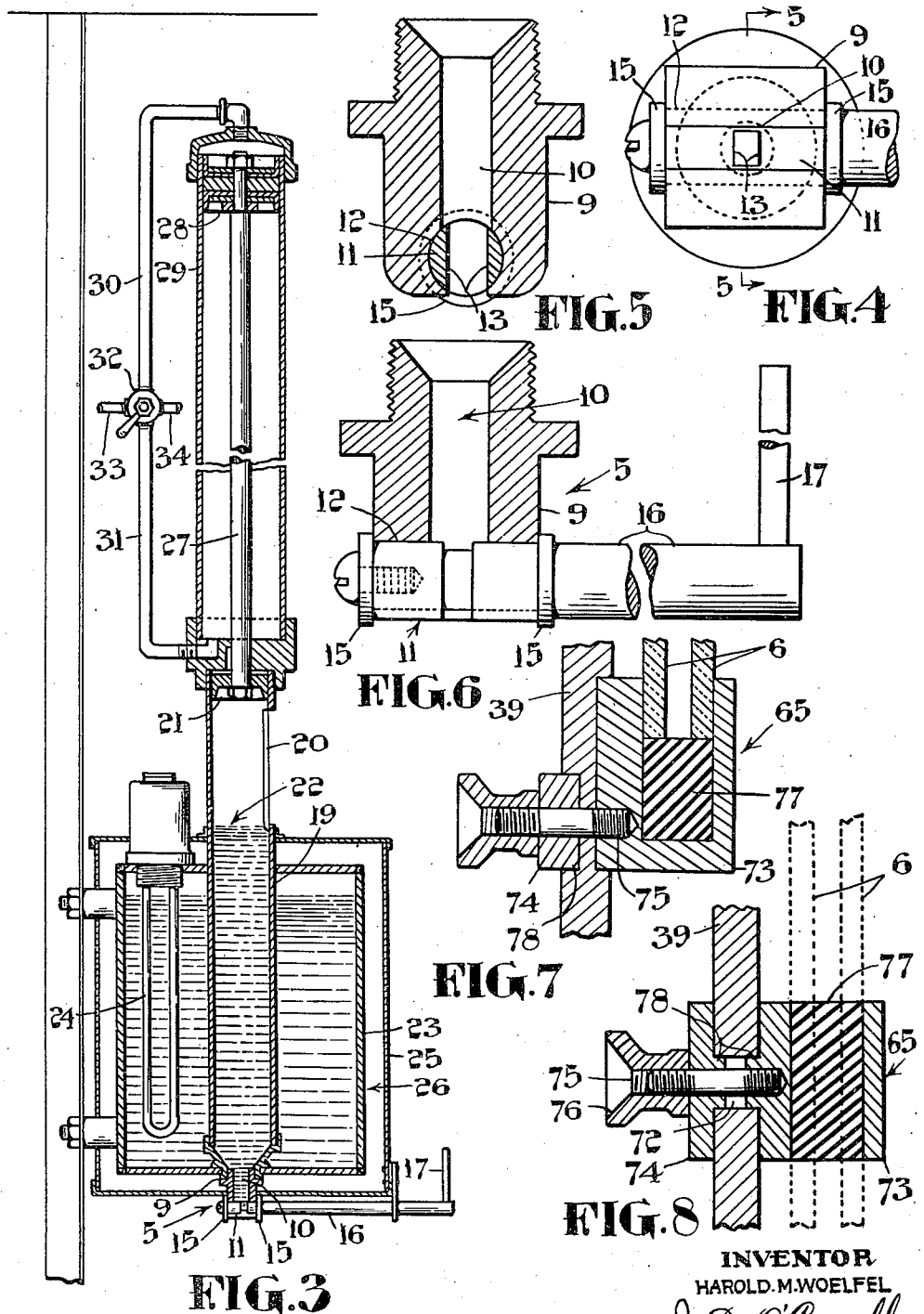

INVENTOR
HAROLD.M.WOELFEL
BY J.D. O'Connell
ATTORNEY

March 10, 1942. H. M. WOELFEL 2,275,811
APPARATUS FOR FORMING MULTIPANE GLAZING UNITS
Filed May 13, 1938  5 Sheets-Sheet 5
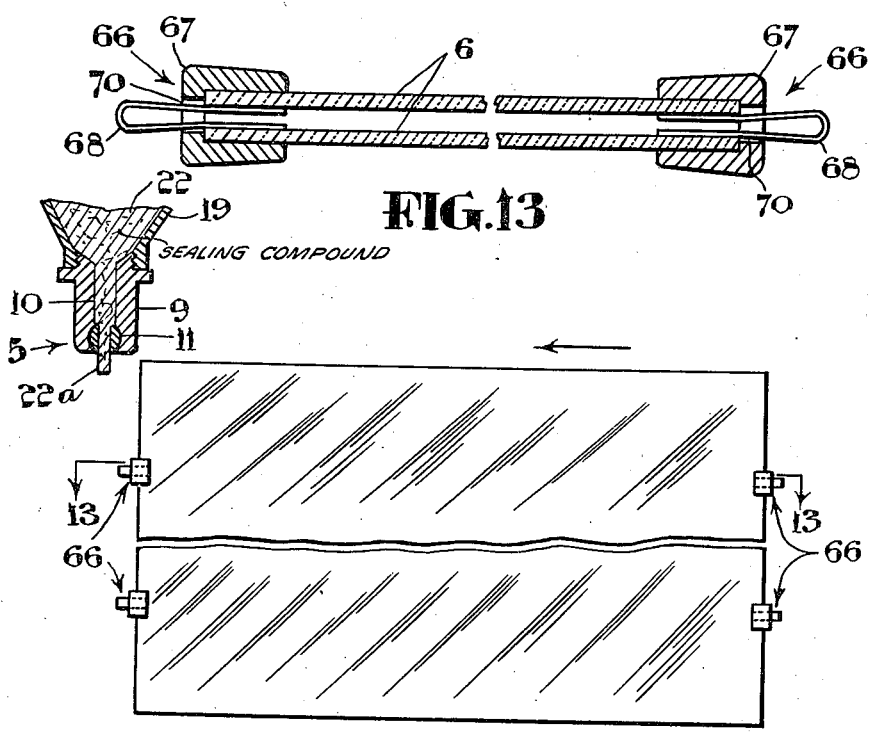
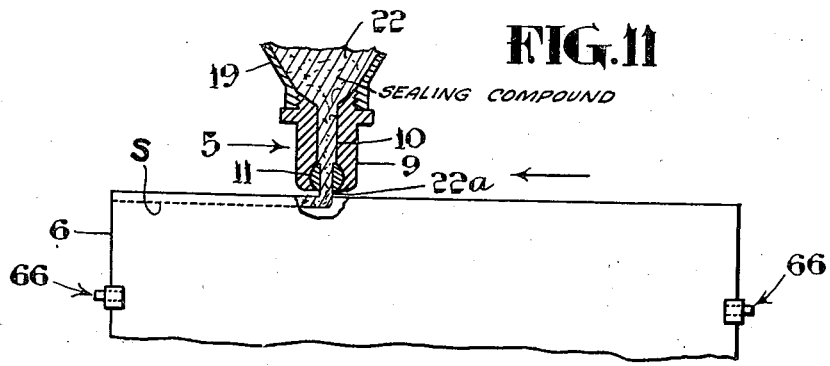
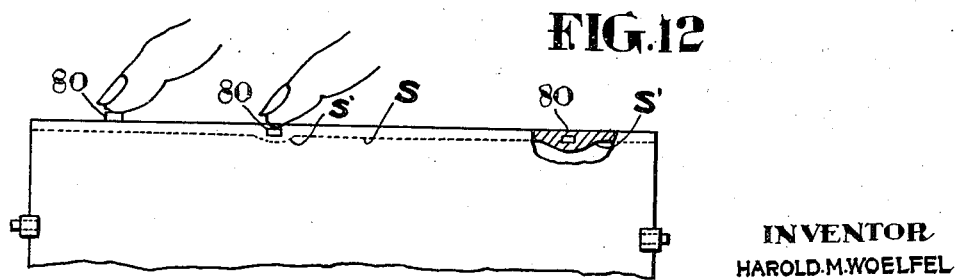
INVENTOR
HAROLD M. WOELFEL
BY J. D. O'Connell
ATTORNEY Patented Mar. 10, 1942

2,275,811

UNITED STATES PATENT OFFICE 2,275,811

APPARATUS FOR FORMING MULTIPANE GLAZING UNITS

Harold M. Woelfel, Montreal, Quebec, Canada, assignor to The Robert Mitchell Co. Limited, Montreal, Quebec, Canada Application May 13, 1938, Serial No. 207,719

15 Claims. (Cl. 154—27)

This invention relates to improvements in preformed multi-pane glazing units for insulating windows and to the provision of a simple and efficient apparatus whereby such units may be rapidly and economically produced on a commercial scale with a minimum of manual labor.

The improved glazing unit provided by this invention comprises two spaced panes of glass cemented together by a continuous marginal sealing strip of plastic composition interposed between their marginal edges. Spacers, preferably in the form of resilient rubber blocks, are embedded in the sealing strip to prevent collapse of the unit by external pressure. The best results from both a service and a manufacturing standpoint are obtained by using a resilient plastic composition which is capable of being extruded into place between the panes and has the property of retaining a soft, non-flowing plastic condition under all climatic conditions to which the glazing unit is likely to be exposed. The use of a sealing composition which remains soft and resilient at low temperatures eliminates the hazard of seal failure due to chipping or cracking of the composition itself. These properties of the sealing composition also serve, in conjunction with the resiliency of the embedded rubber spacers, to lessen danger of rupture of the seal by stresses due to the expansion, contraction and flexure of the glass panes which takes place under varying atmospheric conditions.

In producing my improved glazing unit I employ a stationary extrusion nozzle in combination with a travelling carrier on which the two panes of glass are mounted in upright position and in the desired spaced relation. The plastic sealing composition is extruded through the downwardly directed nozzle in a suitable stream which enters and fills the space between the uppermost edges of the panes as the latter are moved past the nozzle by the carrier. The carrier is power driven at a speed equal to the rate of extrusion to ensure the laying of a uniform strip of the sealing composition between and in adhesive contact with the inner surfaces of the opposed panes. If the travel of the carrier is materially faster than the rate of extrusion, the stream of sealing material extruded into contact with the glass is apt to be subjected to excessive drawing action resulting in undesirable attenuation and rupture. On the other hand, if the travel of the carrier is too slow with reference to the rate of extrusion the result is excessive deposition or piling up of the adhesive composition on the upper portions of the panes.

During the sealing operation the position of the panes on the carrier is changed so that the different corresponding edges to be united by the sealing material are successively presented to the extrusion nozzle. This is facilitated by providing the carrier with supports in which the lowermost edges of the panes are removably mounted. After the initial sealing strip is laid between the then uppermost edges of the panes the latter are removed and turned so that they may be replaced in the supports with different corresponding edges presented to the nozzle. This removal and turning of the two panes is repeated until all the corresponding edges are cemented together by successively laid sealing strips merged at their ends to form a continuous marginal seal for the cell space reserved between the panes.

As previously stated, suitable spacers are embedded in the plastic sealing material to prevent collapse of the unit by external pressure. These spacers preferably consist of resilient blocks of rubber. They are placed against the exposed surfaces of the previously applied sealing strips and then pressed inwardly to a position inwardly of the adjacent marginal edges of the panes. The plasticity and resiliency of the sealing composition is such that the portions of the sealing strips into which the spacers are pressed are bulged inwardly without being ruptured by the spacers. After the spacers have been forced into place additional sealing material is applied by the operator to cover their exposed surfaces.

In some cases, especially when the glazing unit is of relatively large size, the marginal edges of the unit are provided with U-shaped metal binding strips which are fitted over the edges of the panes and cemented in place to hold the panes against accidental displacement. In other instances the marginal portions of the glazing unit may be provided with protective strips of metal foil such, for example, as the protective strips described and claimed in the co-pending application of Solomon G. Lipsett, filed August 29, 1938, under Serial No. 227,405, now Letters Patent No. 2,233,952, dated March 4, 1941.

The units provided in accordance with this invention may be of the hermetically sealed type or may be vented as disclosed in the aforesaid co-pending application.

In the further description of this invention reference will be had to the accompanying drawings, in which—

Fig. 2 is a front elevation of the apparatus appearing in Fig. 1.

Fig. 3 is an enlarged vertical sectional view of an extrusion unit forming part of the apparatus illustrated in the preceding figures.

Fig. 4 is a bottom plan view of an extrusion nozzle forming part of the unit illustrated in Fig. 3.

Fig. 5 is a sectional view of the extrusion nozzle, the plane of the section being substantially along the line 5—5 of Fig. 4.

Fig. 6 is a sectional view taken substantially along the line 6—6 of Fig. 5.

Fig. 7 is a sectional view along the line 7—7 of Fig. 2.

Fig. 8 is a sectional view along the line 8—8 of Fig. 2.

Fig. 9 is a sectional view along the line 9—9 of Fig. 2.

Figs. 11 and 12 are diagrammatic views illustrating the manner in which the sealing material is laid between the upper edges of the transparent panes as the latter are carried past the extrusion nozzle. These figures also show the manner in which the panes are temporarily secured in spaced relation prior to being mounted on the carrier.

Fig. 13 is a sectional view along the line 13—13 of Fig. 11.

Fig. 14 is a view illustrating the manner in which the resilient spacers are embedded in the sealing composition interposed between the edges of the transparent panes.

Figure 1:
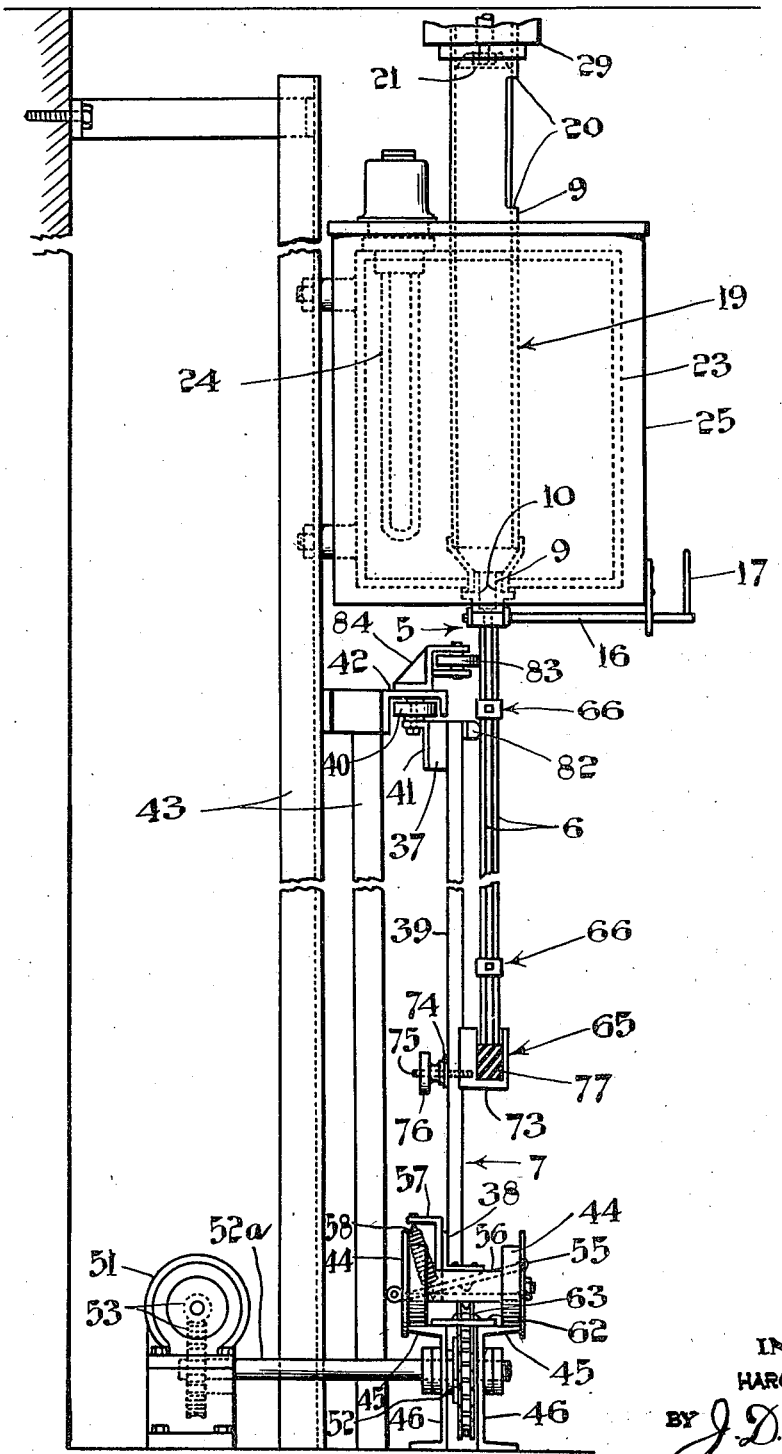
Fig. 1 is an end elevation of a preferred embodiment of the apparatus provided in accordance with this invention.

In these drawings, 5 designates the stationary extrusion nozzle through which the sealing compound is forced between the uppermost edges of the glass panes 6 as the latter are carried past the nozzle by the travelling carrier 7.

The preferred embodiment of nozzle 5 is shown in detail in Figs. 4, 5 and 6. It comprises a valve casing 9 provided with a vertical delivery passage 10 controlled by a valve 11. In the present instance valve 11 is shown as a cylindrical valve working in a horizontal valve bore 12 intersecting the lower end of passage 10. This valve is provided with a through port 13 and is held against longitudinal movement by suitable abutments 15. One end of the valve is extended to provide a stem 16 equipped with a laterally extending operating handle 17.

The upper end of casing 9 (Figs. 1 and 3) is screwed into the lower end of a tubular feed chamber 19 provided with a charging opening 20 and a feed plunger 21. The sealing compound 22 is charged into chamber 19 through opening 20 and is maintained at a suitable extrusion temperature by a surrounding body of heated oil contained in an oil tank 23. This oil tank encloses the major portion of feed chamber 19 and may be provided with an electric heating element 24 or other suitable oil heating means. Heat losses due to radiation are preferably minimized by enclosing the oil tank 23 in an outer sheet metal casing 25 separated therefrom by an intervening air space 26.

The feed plunger 21 (Fig. 3) is connected, by piston rod 27, to an operating piston 28 working in cylinder 29. Pressure fluid is alternately admitted to and exhausted from opposite ends of cylinder 29 through suitable pipe connections 30 and 31. In the present instance I have shown a conventional three-way valve 32 through which pipes 30 and 31 are alternately connected to fluid pressure supply line 33 and exhaust line 34.

Prior to the charging of feed chamber 19 the lower end of nozzle passage 10 is closed off by valve 11 and pressure fluid is supplied to the lower end of cylinder 29, through line 33, valve 32 and pipe 31, to raise feed plunger 21 and piston 28 to the starting position shown in Fig. 3. When the charging of chamber 19 is completed pressure fluid is supplied to the upper end of cylinder 29 by turning valve 32 to a position connecting pipe 30 with the supply line 33. In this position of the valve the pressure previously supplied to the lower end of cylinder 29 is exhausted through pipe 31 and exhaust line 34. The pressure now acting on piston 28 moves the feed plunger 21 downwardly until the latter is halted by the resistance of the sealing compound trapped above the closed nozzle valve 11. When valve 11 is opened a stream of the sealing compound is extruded through the nozzle passage 10 and valve port 13 by the pressure of the feed plunger 21. The size and shape of the extruded stream 22a (Figs. 11 and 12) is determined by the size and shape of valve port 13.

Figure 10:
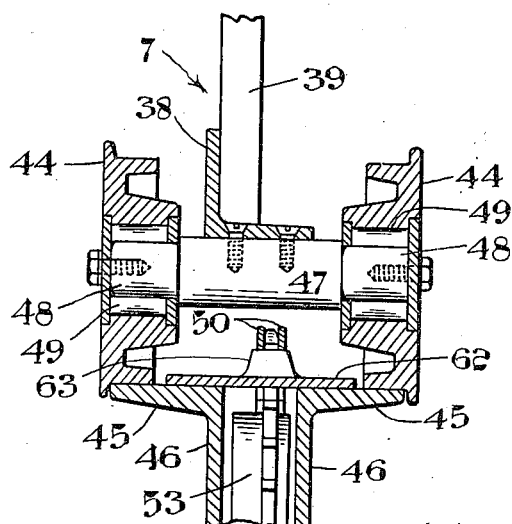
Fig. 10 is a sectional view along the line 10—10 of Fig. 2.

The carrier 7 is shown as a vertical rack comprising horizontal top and bottom members 37 and 38 joined together by vertical members 39. The top member 37 is equipped with guide rolls 40 journalled in suitable brackets 41. These guide rolls work in a guide channel 42 fastened to the main frame structure 43 and assist in holding the carrier 7 in an upright position. The bottom member of carrier 7 is supported by wheels 44 running on the upper flanges 45 of a pair of reversely arranged channel shaped track beams 46. As shown more particularly in Fig. 10 the wheels 44 are carried by axles 47 fastened to the bottom member 38 of carrier 7. Each axle 47 is provided with cylindrical end portions 48 on which the wheels 44 are fastened by means of suitable ball bearings 49.

Carrier 7 is moved in one direction by power means comprising an endless chain 50 driven by an electric motor 51. Chain 50 is carried by sprockets 52 and 53 journalled between the track beams 46. The axle 52a of sprocket 52 is continuously driven by motor 51 through worm gearing 53 (Fig. 1) or any other suitable type of reduction gearing. Chain 50 travels continuously in the direction indicated by the applied arrows in Fig. 2.

Suitable means are provided for establishing a releasable drive connection between carrier 7 and drive chain 50. As here shown such means comprises a foot treadle bar 55 (Figs. 2 and 9) provided with laterally extending arms 56 having their free ends pivoted to brackets 57 attached to the bottom member 38 of carrier 7. Treadle bar 55 is normally supported in the raised position shown in the drawings by springs 58 connected between the arms 56 and the brackets 57. Each arm 56 is provided with a tooth or projection 60 which fit between the link connecting pins of chain 50 when the treadle bar 55 is depressed against the resistance of spring 58. The driving connection thus established causes the carrier to move with the chain 50, the treadle being held down with a light pressure which permits it to slide beneath the foot of the operator. The carrier stops when the foot treadle is released since the springs 58 immediately raise the arms 56 to disrupt the drive connection. A plate 62 is preferably fastened to the top flanges of the track beams 46 to extend substantially the full distance between the chain sprockets 52 and 53. This plate is provided with a track rib 63 which guides and supports the upper flight of chain 50.

The glass panes 6 are mounted on the carrier 7 with their lower edges resting in suitable supports 65. Prior to being so mounted the two panes are temporarily fastened together in the desired spaced relationship by removable fittings generally indicated at 66. The edges of the panes to which these fittings are applied are disposed vertically when the panes are initially mounted on the carrier. As shown more particularly in Figs. 11 and 13 each fitting comprises a U-shaped clip 67 and a U-shaped spacer spring 68. Each clip 67 is fitted over corresponding edges of the panes as shown in Fig. 13 and is provided with an opening 70 through which the free ends of the cooperating spring 68 are passed into spreading engagement with the inner surfaces of the two panes. As each spring is released its side arms separate and press the panes against the side arms of the cooperating clip. The resulting assembly is then mounted on the carrier supports 65.

The supports 65 work in vertical slots 72 reserved between the rack members 39 and are constructed so that they may readily be anchored at any point along the length of the slots. As shown in Figs. 7 and 8, each support comprises a cushion holder 73 and a clamping plate 74 engaging opposite sides of the adjacent rack member 39 to which they are clamped by means of the bolt 75 and wing nut 76. The holder 73 is shown as a U-shaped member containing a rubber or other suitable cushion 77 on which the lower edges of the panes 6 rest when inserted in the holder as shown in Fig. 7. Both the holder 73 and the clamp plate 74 of each support are provided with tongue portions 78 which are fitted in the slot 39 to prevent rotation of the support about the axis of bolt 75.

In the use of the apparatus described herein the carriage 7 is initially positioned so that the relative positioning of the nozzle 5 and the glass panes 6 is substantially as represented in Fig. 11. The operator then opens the nozzle valve 11 so that the sealing compound is extruded through the nozzle 5 in a suitable stream 22a. As the extruded stream 22a reaches the proper length the operator presses the treadle bar 55 to establish a drive connection between the carrier 7 and the chain 50. As the upper edges of the panes 6 are carried past the nozzle by the resulting travel of the carrier they are cemented together by the extruded sealing compound which is held between them as shown in Fig. 12. When these edges of the panes have been sealed together along their entire length the nozzle valve 11 is closed and the carrier 7 is released from chain 50 and returned to starting position. Rubber spacing blocks 80 are then pressed into place between the sealed edges of the panes as shown in Fig. 14. During the placement of these spacers the portions of the sealing strip S into which they are pressed are bulged inwardly as indicated at S'. These inwardly bulged portions S' ensure a tight seal between the glasses at the points where the spacers are applied.

The partly sealed panes 6 are now removed from the supports 65 and then replaced so that the edges which formerly rested on said supports are presented to the nozzle 5 to receive a sealing strip therebetween. When these latter edges have been sealed together and fitted with the rubber spacers the temporary fittings 66 are no longer required and are removed. The edges from which these fittings are removed are then successively sealed together and fitted with permanent spacers in the same manner as described in connection with the previously mentioned edges.

Figure 15:
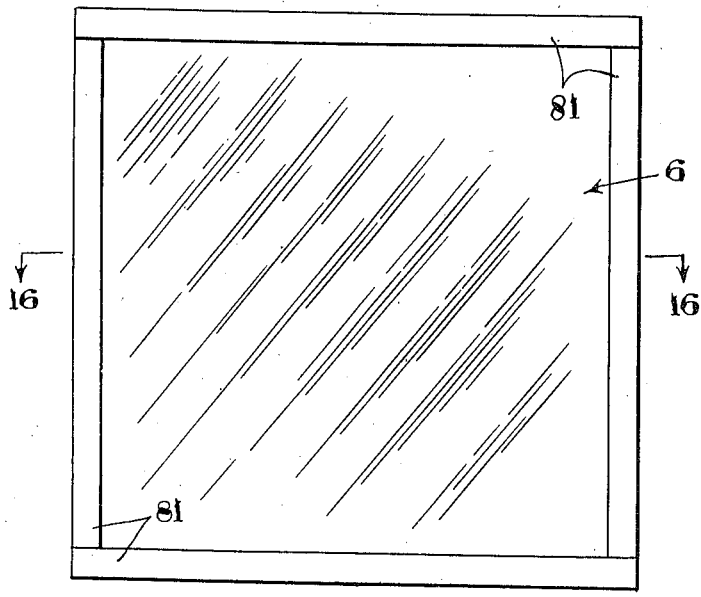
Fig. 15 is a view, in side elevation, of the complete glazing unit provided in accordance with this invention.
Figure 16:
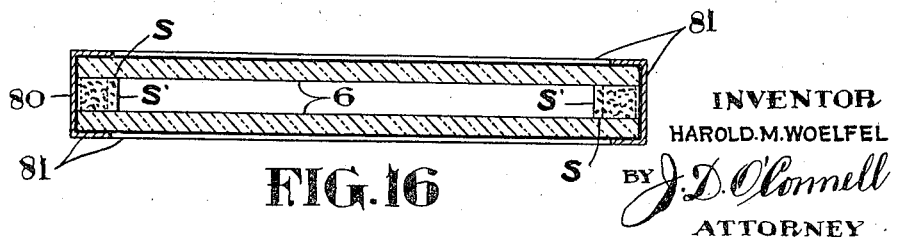
Fig. 16 is a sectional view taken substantially along the line 16—16 of Fig. 15.

If the glazing unit is to be of the hermetically sealed type a hypodermic needle is forced through one of the sealing strips S to provide an outlet through which the air may be pumped from the cell space between the panes 6. When the needle is withdrawn the plastic material displaced thereby resumes its former position and closes the needle opening. The panes 6 are then clamped together at their edges by U-shaped metal binding strips 81 applied as shown in Figs. 15 and 16.

If the glazing unit is to be of the vented type it is equipped with suitable venting means such, for example, as the outdoor venting means disclosed in the aforesaid Letters Patent. The metal foil protecting shown in this application may also be used in place of the binding 81 to prevent impairment of the sealing strips S by the oils and solvents contained in the caulking compounds employed for mounting the glazing unit in a sash or window frame.

During the sealing operation one hand of the operator is pressed lightly against the nearest pane 6 to hold the companion pane 6 against a cushioning element 82 and a guide roller 83 (Figs. 1 and 2). The cushioning element 82 comprises a strip of rubber or other suitable resilient cushioning material extending across the upper front edge portion of carrier 7. The guide roller 83 rotates about a vertical axis and is journalled in a suitable bracket 84 mounted on the channel member 42. The guide roller 83 serves as a gauge against which the adjacent pane 6 is pressed to ensure correct positioning of the upper edges of the panes with reference to the extrusion nozzle.

I have found that the bonding of the sealing strips S with the panes 6 is improved when the uppermost edges of the panes are heated prior to being passed beneath the extrusion nozzle 5. This heating of the panes may be accomplished in any desired manner, for example, by providing spaced electric heating elements at the right of the nozzle 5 so that the uppermost edges of the panes pass between and are heated by these heating elements as the said edges are moved into position beneath the nozzle. The heating elements may be fastened to opposite side walls of a hood which fits over the upper edges of the panes when the latter are positioned to the right of nozzle 5.

Having thus described my invention, what I claim is:

1. Apparatus for use in the manufacture of multi-pane glazing units comprising two spaced transparent panes having their marginal edges cemented together by a continuous interposed sealing strip of plastic composition, said apparatus comprising extrusion means for forcing the sealing composition into place between said panes while the latter are supported in spaced opposing relation with the opposing surfaces of the panes separated by an intervening air space and with corresponding edges of the panes lying in a common plane and mechanical means for effecting relative movement between the extrusion means and said panes whereby the sealing composition is laid in place in the form of a continuous strip extending uninterruptedly along the marginal portions of said panes.

2. Apparatus for use in the manufacture of multi-pane glazing units comprising two spaced transparent panes having their opposing surfaces separated by an intervening air space and their marginal edges cemented together by a continuous interposed sealing strip of plastic composition forming the marginal wall of said air space, said apparatus comprising means for holding said panes in spaced opposing relation with the opposing surfaces of the panes separated by an intervening air space and with corresponding edges of the panes lying in a common plane, a nozzle through which the sealing composition is extruded into place between said panes and means, including said holding means, for moving the corresponding edges of the panes successively past said nozzle so that the sealing composition is laid between the marginal portions of the panes in the form of a continuous sealing strip.

3. Apparatus for use in the manufacture of multi-pane glazing units comprising two spaced transparent panes separated by an intervening air space and having their marginal edges cemented together by an interposed adhesive strip of plastic composition forming a marginal wall of said air space, said apparatus comprising a travelling carrier on which the two panes are arranged in substantially parallel relation with their opposing surfaces separated by an air space and their corresponding edges lying in a common plane, an extrusion nozzle through which the sealing composition is extruded in the form of a stream which is directed into the space between the uppermost edges of the panes and is laid between said edges in the form of a sealing strip substantially co-extensive with the length of said edges when the latter are moved in a predetermined path by the carrier and means for operating said carrier.

4. Apparatus as set forth in claim 3 in which the carrier is provided with means for removably supporting the transparent panes so that the position of the panes on the carrier may be changed to successively present the different corresponding edges of the panes to the nozzle.

5. Apparatus as set forth in claim 3 in which the means for operating said carrier comprises a travelling element, power means for imparting travelling movement thereto and means for establishing a releasable coupling connection between the carrier and the travelling element.

6. Apparatus as set forth in claim 3 in which the means for operating the carrier comprises an endless chain, means for driving said chain and means for establishing a releasable coupling connection between the chain and the carrier.

7. Apparatus of the character described comprising a carrier movable in a horizontal path, stationary extrusion apparatus including a downwardly directed extrusion nozzle located above the carrier and means for extruding a downwardly directed stream of plastic sealing composition through said nozzle, means for mounting a pair of transparent panes in upright position on the carrier, means for maintaining said panes in spaced opposing relation with the opposing surfaces of the panes separated by an intervening air space and with the corresponding edges of the panes lying in a common plane and means for operating the carrier to move the upper edges of the panes past the delivery opening of the extrusion nozzle during the extruding operation, the path of movement of the carrier and the arrangement of the panes thereon being such that the stream of material extruded through the nozzle is directed into the space between the upper edge portions of the panes to form an interposed sealing strip substantially co-extensive with said edge portions.

8. Apparatus as set forth in claim 7 in which the panes are removably and reversibly mounted on the carrier so that the different corresponding edge portions of the panes may be presented to the nozzle successively to receive the extruded sealing material therebetween.

9. Apparatus as recited in claim 7 in which the means for mounting the panes in an upright position on the carrier comprises a vertical rack movable with said carrier and provided with supports engageable with the lowermost edges of said panes.

10. Apparatus as recited in claim 7 in which the means for maintaining said panes in spaced opposing relation comprises spacing clamps secured to edge portions of the panes.

11. Apparatus of the character described comprising a vertically disposed travelling rack member, upper and lower guides by which said rack member is constrained to travel in a predetermined path, a stationary extrusion apparatus including a downwardly directed extrusion nozzle located above and to one side of the rack member, means for extruding a downwardly directed stream of plastic sealing composition through said nozzle, supports carried by the rack member and adapted to support a pair of transparent panes in an upright position, means for maintaining said panes in spaced parallel relation with the opposing surfaces of the panes separated by an intervening air space and with corresponding edges of the panes lying in a common plane, the lowermost edges of said panes being sustained by said supports, and means for imparting travelling movement to said rack whereby the upper edges of the panes are moved in parallel paths lying at opposite sides of the delivery opening of the extrusion nozzle during the extruding operation.

12. Apparatus of the character described comprising upper and lower guideways, a vertically disposed travelling rack provided with top and bottom guiding elements engaging said guideways to constrain said rack to a predetermined path of travel, a downwardly directed extrusion nozzle located above said rack, means for extruding a downwardly directed stream of plastic sealing composition through said nozzle, supports carried by said rack and adapted to be utilized for supporting the lower edges of a pair of transparent panes which are temporarily fastened together in spaced parallel relation so that, when said panes are mounted in upright position on said supports, they will be moved in paths located at opposite sides of the delivery opening of the extrusion nozzle during travelling movement of said rack.

13. Apparatus of the character described comprising a main frame structure, an elevated receptacle carried by said frame structure and containing a plastic sealing composition, said receptacle being provided with a downwardly directed extrusion nozzle and with means for extruding a downwardly directed stream of the plastic sealing composition through said nozzle, an upright travelling rack member positioned below said extrusion nozzle, upper and lower guide elements engaging cooperating guide elements provided at the top and bottom portions of said rack, supporting devices carried by the rack and adapted to be utilized for supporting a pair of spaced transparent panes between which a strip of the sealing composition is to be laid during travelling movement of the rack and power means for imparting travelling movement to said rack.

14. Apparatus for forming a multi-pane glazing unit comprising horizontally extending guide rails, a vertically disposed rack member provided at its lower edge with supporting wheels arranged to travel on said rails, cooperating guide elements arranged to guide the upper edge of the rack during travelling movement thereof, means carried by said rack for supporting a pair of transparent panes in an upright position at one side of the rack, spacing means for holding said panes in spaced opposing relation to each other, a stationary extrusion apparatus including a downwardly directed extrusion nozzle located above and to one side of the rack member, means for extruding a downwardly directed stream of plastic sealing composition through said nozzle and into the space between the upper edges of said panes and means for imparting travelling movement to said rack member whereby the upper edges of the panes are moved in parallel paths lying at opposite sides of the delivery opening of the extrusion nozzle during the extruding operation.

15. Apparatus for forming a multi-pane glazing unit comprising a pair of laterally spaced guide rails, a vertically disposed rack member provided at its lower edge with supporting wheels arranged to travel on said rails, cooperating guide elements arranged to guide the upper edge of the rack during travelling movement thereof, means carried by said rack for supporting a pair of transparent panes in an upright position at one side of the rack, spacing means for holding said panes in spaced opposing relation to each other, a stationary extrusion apparatus including a downwardly directed extrusion nozzle located above and to one side of the rack member, means for extruding a downwardly directed stream of plastic sealing composition through said nozzle and between the upper edges of said panes, and means for imparting travelling movement to said rack whereby the upper edges of the panes are moved in parallel paths lying at opposite sides of the delivery opening of the extrusion nozzle during the extruding operation, said last mentioned means comprising an endless rack driving element arranged between said rails, means for driving said element, and means for establishing a releasable coupling connection between said element and said rack member whereby the latter is moved longitudinally of said rails.

HAROLD M. WOELFEL.